Figure 1:
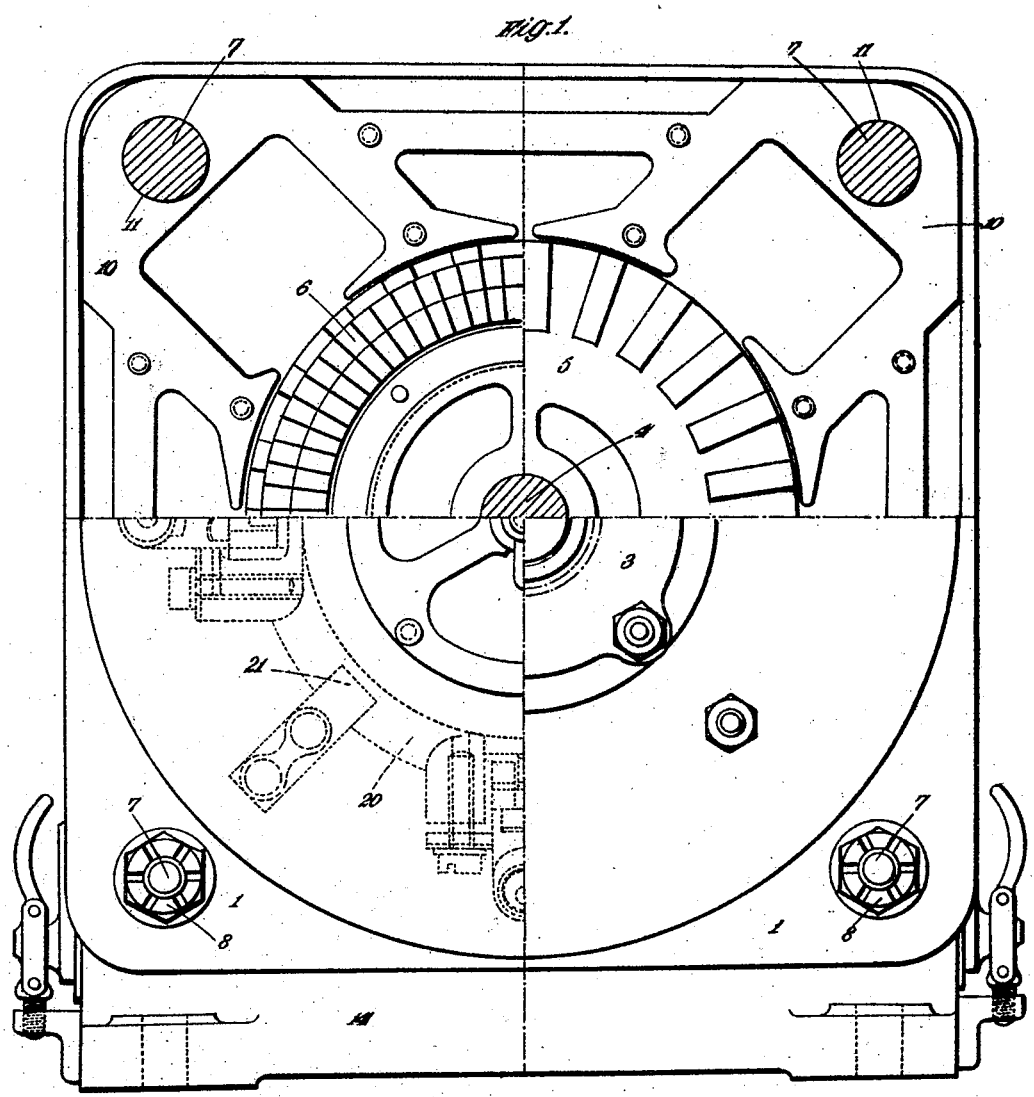

T. L. R. COOPER AND J. C. TODMAN.
DYNAMO-ELECTRIC MACHINE.
APPLICATION FILED NOV. 21, 1918.

1,408,931.

Patented Mar. 7, 1922.
2 SHEETS—SHEET 1.

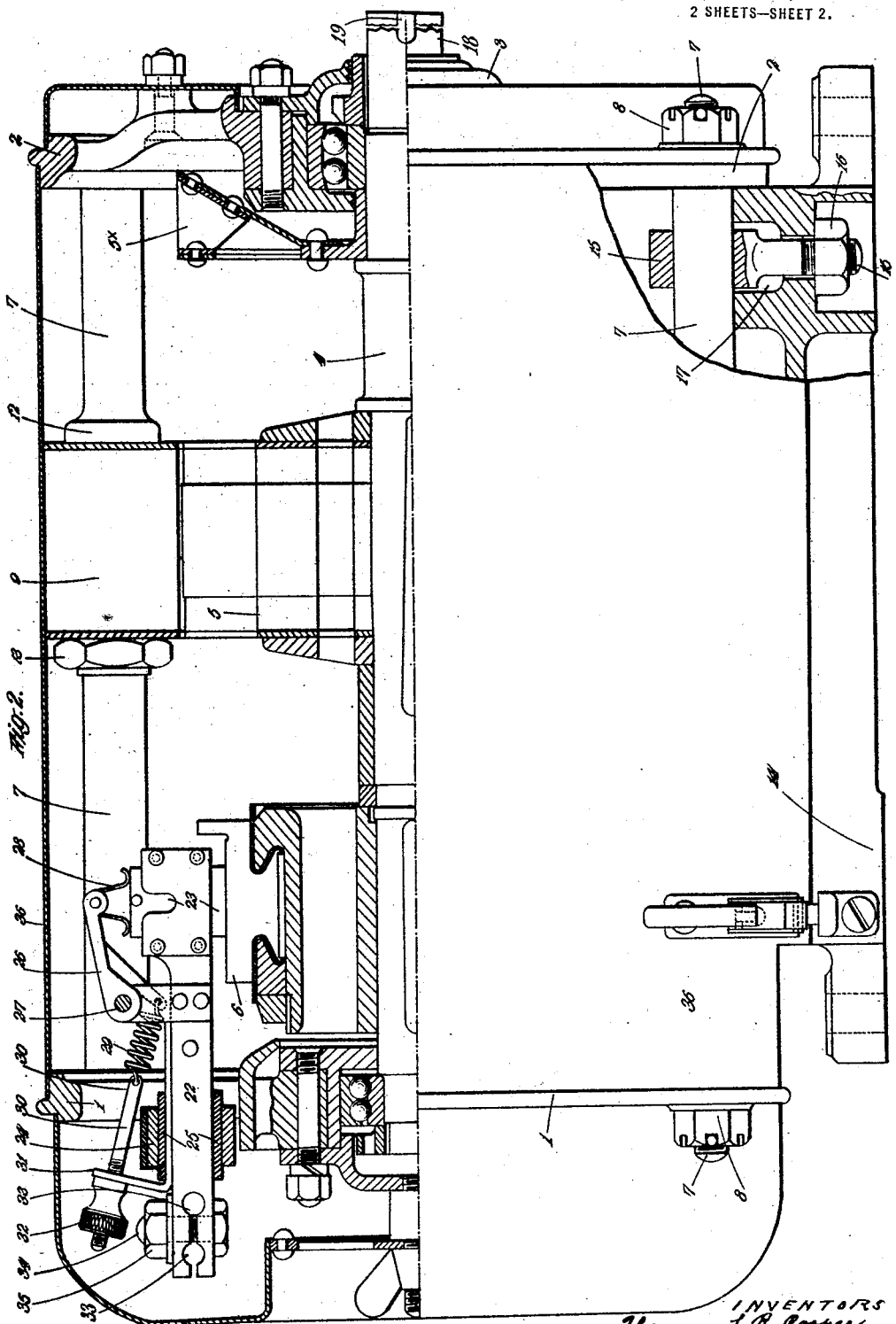

UNITED STATES PATENT OFFICE.

THOMAS LANCELOT REED COOPER AND JAMES CLAUD TODMAN, OF LONDON, ENGLAND; SAID COOPER ASSIGNOR OF HIS ENTIRE RIGHT TO RICHARD JOHN HAWKES RYALL, OF KEW, ENGLAND.

DYNAMO-ELECTRIC MACHINE.

1,408,931.  Specification of Letters Patent.  Patented Mar. 7, 1922.

Application filed November 21, 1918. Serial No. 263,450.

*To all whom it may concern:*

Be it known that we, THOMAS LANCELOT REED COOPER, a subject of the King of Great Britain and Ireland, of London, England, and JAMES CLAUD TODMAN, a subject of the King of Great Britain and Ireland, of London, England, have invented certain new and useful Improvements in Dynamo-Electric Machines, of which the following is a specification.

This invention relates to dynamo-electric machines and has for its object to provide an improved construction or method of assembling the usual elements of such machines, designed to reduce the weight of the machine as a whole to a minimum, to afford increased ventilation of the parts, and to facilitate the adjustment of the brushes and brush holders in their operative positions.

With a view to realizing this object the invention consists broadly in dispensing with the usual field magnet structure in which is integrally included a base plate and pedestals or the like supports for the rotor shaft, and in substituting therefor a built up structure comprising two separate and independent end brackets made as light as possible and carrying bearings for the rotor shaft, and a series of rods rigidly connecting these end brackets together arranged preferably symmetrically around the rotor axis and carrying the active elements of the stator or field magnet, the rods being provided with means intermediate their ends securing the stator elements in their correct operative position relatively to the rotor. The invention also includes various subsidiary features to which such a built up structure readily lends itself, as will be pointed out in the following description and specified in the claims.

In the accompanying drawings Fig. 1 is an end view partly sectional and Fig. 2 a side view partly sectional of a dynamo-electric machine constructed in accordance with this invention.

Referring to the drawings the dynamo-electric machine illustrated therein consists of two independent and separate end brackets 1 and 2, which may conveniently be formed from a stamped up plate and are made as light as possible, for instance by forming each with a solid peripheral part and a central or hub part after the manner of a spider having radiating arms. Each of these end brackets carries a bearing 3 for one end of a shaft 4 upon which is mounted any usual form of rotor 5 which, as shown, may include a commutator 6 and ventilating fan 5ˣ; the end brackets are rigidly held together by rods 7 and nuts 8 or any other effective securing means.

Upon the rods 7 any usual form of stator or field magnet 9 is mounted; in the form shown the stator 9 is laminated and consists of a number of stampings 10 of the form shown in Fig. 1. These stampings are provided with holes 11 (Fig. 1) to take the rods 7 and are firmly clamped together between collars 12, which may be integral with the rods 7, and nuts 13 interiorly screw threaded to co-act with externally threaded portions of the rods 7 (Fig. 2).

A built up machine such as that described above may be firmly secured upon a base plate 14 by means of ring bolts 15 arranged upon two of the rods 7 and secured by nuts 16 in recesses or sockets 17 formed for this purpose in the base plate 14, as clearly shown in the lower right hand end of Fig. 2. It is to be noted, however, that the working elements of the machine, namely, the rotor and stator, are both mechanically and magnetically in working relation to one another independently of the said base plate and that in place of the latter any desired or suitable arrangement may be adopted for supporting the machine in a fixed position with a view to driving it by means of any available power, or to take power from it when the machine is used as an electric motor; for either of these purposes a pulley may be keyed upon the projecting end 18 of the shaft 4 of the rotor by means of a spline 19 (Fig. 2.)

When the machine is of the commutator type the built up structure described above may with advantage be completed by a similarly built up brush gear so designed that the entire brush gear can easily be installed and secured in its working position and be bodily dismounted therefrom when only the outer side of the commutator end bracket 1 is accessible.

A built up arrangement of this kind is illustrated at the left hand end of Fig. 2 and partly in dotted lines in Fig. 1 and includes means for adjusting both the pressure and the position of the brushes upon the commutator. This arrangement comprises a rocker ring 20 which may be clamped to an arm of the end bracket 1 by means of clamps 21 (Fig. 1) and carries box type brush holders 22 of which one is shown in Fig. 2 containing brushes 23, preferably of carbon, the brush holder 22 being adjustably secured upon the rocker ring 20 by clamps 24 and insulated from the said ring by insulation 25.

The pressure of the brush 23 upon the commutator can be readily adjusted by means of an arm 26 pivoted at 27 upon the brush holder 22, the free end of the arm carrying a leaf spring 28 pressing upon the brush while a depending lug or similar part of the said arm is connected to a tension spring 29 and thence to a rod 30 passing through an opening in a small bracket 31 secured to the brush holder, the outer end of the rod being provided with a screw thread upon which works an adjusting screw 32. In order to enable the brush holders to be readily connected electrically to the working circuit they are provided with suitable openings 33, terminal clamps 34, and clamping nuts 35.

It will be seen that with this arrangement the position and pressure of the brushes upon the commutator, the circumferential position of the rocker ring upon the end bracket, and the connections from the commutator to the outer circuit, can all be adjusted and manipulated and the brush gear be bodily dismounted and replaced entirely from the outside of the commutator end bracket 1, a considerable advantage when the built up machine is required to be carried in a confined space rendering the upper side of the machine inaccessible.

The working parts of the machine may be protected when desired by means of an outer cover 36 consisting of sheet metal, and the details of the construction described above may be variously modified without exceeding the scope of the invention, as will be readily understood.

The above described built up construction of a dynamo electric machine consisting entirely of wrought materials is particularly advantageous for war purposes and under all conditions requiring the machines to be rapidly moved about from place to place and to be readily connected to and disconnected from an explosion engine or other available source of power.

What we claim is:—

1. In a dynamo electric machine, the combination of laminated field magnets, supporting members passing through the laminations of said magnets, and having means for clamping said laminations together, independent end brackets supported and connected together by said members, a base plate, and means for rigidly securing two of said supporting members to the base plate.

2. In a dynamo electric machine, the combination of laminated field magnets, supporting members passing through the laminations of said magnets and each provided with an abutment at one portion thereof and exteriorly threaded at another portion, a nut cooperating with said threaded portion to clamp said laminations between it and said abutment, a pair of independent end brackets supported by and connected together by said supporting members, a base plate, and ring bolts for securing some of said supporting members to the base plate.

In testimony whereof we have signed our names to this specification.

THOMAS LANCELOT REED COOPER.
JAMES CLAUD TODMAN.